R. H. UPSON.
PARACHUTE.
APPLICATION FILED NOV. 9, 1916.

1,273,553.

Patented July 23, 1918.
2 SHEETS—SHEET 1.

Inventor
Ralph H. Upson.

Witness
R. S. Trogner.

By C. L. Landon
Attorney

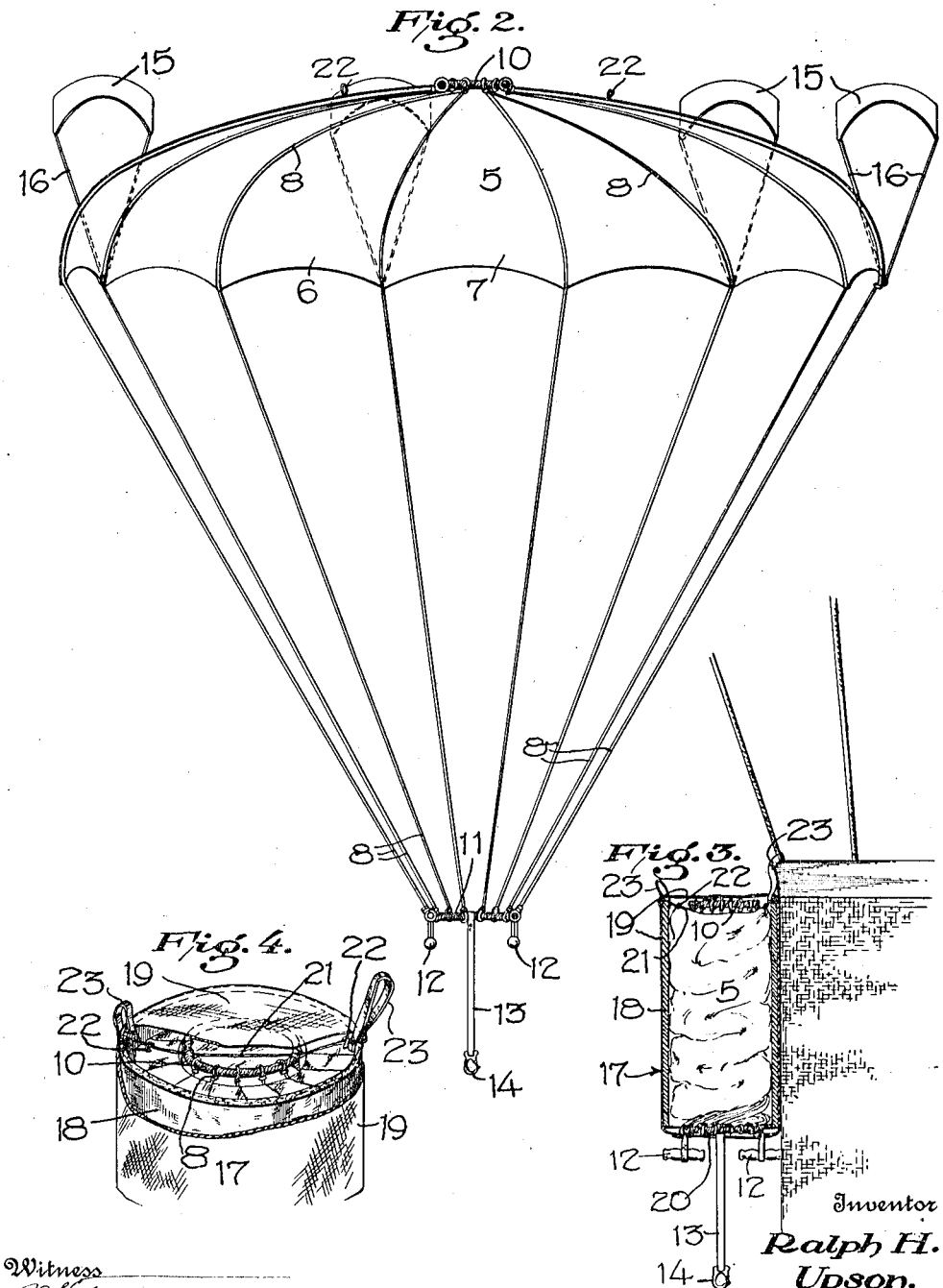

UNITED STATES PATENT OFFICE.

RALPH H. UPSON, OF AKRON, OHIO, ASSIGNOR TO THE GOODYEAR TIRE & RUBBER COMPANY, OF AKRON, OHIO, A CORPORATION OF OHIO.

PARACHUTE.

1,273,553.  Specification of Letters Patent.  Patented July 23, 1918.

Application filed November 9, 1916. Serial No. 130,379.

*To all whom it may concern:*

Be it known that I, RALPH H. UPSON, a citizen of the United States, residing at Akron, in the county of Summit and State of Ohio, have invented new and useful Improvements in Parachutes, of which the following is a specification.

My present invention relates to landing parachutes for aeronauts and in particular comprehends improvements directed toward the provision of a parachute which will be almost instantaneously opened, when released, to exert its checking influence upon the drop or downward flight of the aeronaut.

Parachutes now in common use require a drop of several hundred feet, in some instances, before they are opened from the furled condition in which they are stowed to the extent required to assist the aeronaut in safely alighting from his aerial craft. This has precluded the safe use of such instruments when the aeronaut has been operating at a comparatively short distance from the ground, as is the case with captive balloons, low flying aeroplanes or the like.

As a principal object of this invention, I contemplate the provision of auxiliary parachute surfaces which are carried at the extremity or peripheral portion of the main parachute surface and which will immediately open to the action of the upward air rush when the parachute is released for a drop. These auxiliary surfaces act to unfurl the main parachute immediately after the device has been cast loose and so adapt the parachute proper for efficient use in short range drops.

It is a further object of this invention to provide means for stowing a parachute away in unused condition in such a manner that there are no lashings to cast off, or buckles, ropes, straps, cords or other ties of any kind to unlash when the device is to be put in use.

Both of these features of my invention are requisite safeguards to prevent injury to the aviator or aeronaut who has been operating at a height lower than the minimum at which the ordinary cumbersome, slow-opening parachute may be considered a guarantor of safe landing.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Fig. 2 is a cross-sectional view of the parachute as fully extended for its downward flight;

Fig. 3 is a sectional view of the parachute as normally stowed away within its container; and Fig. 4 is a fragmentary perspective view of the container with the inclosed parachute, parts being broken away.

Figure 1:
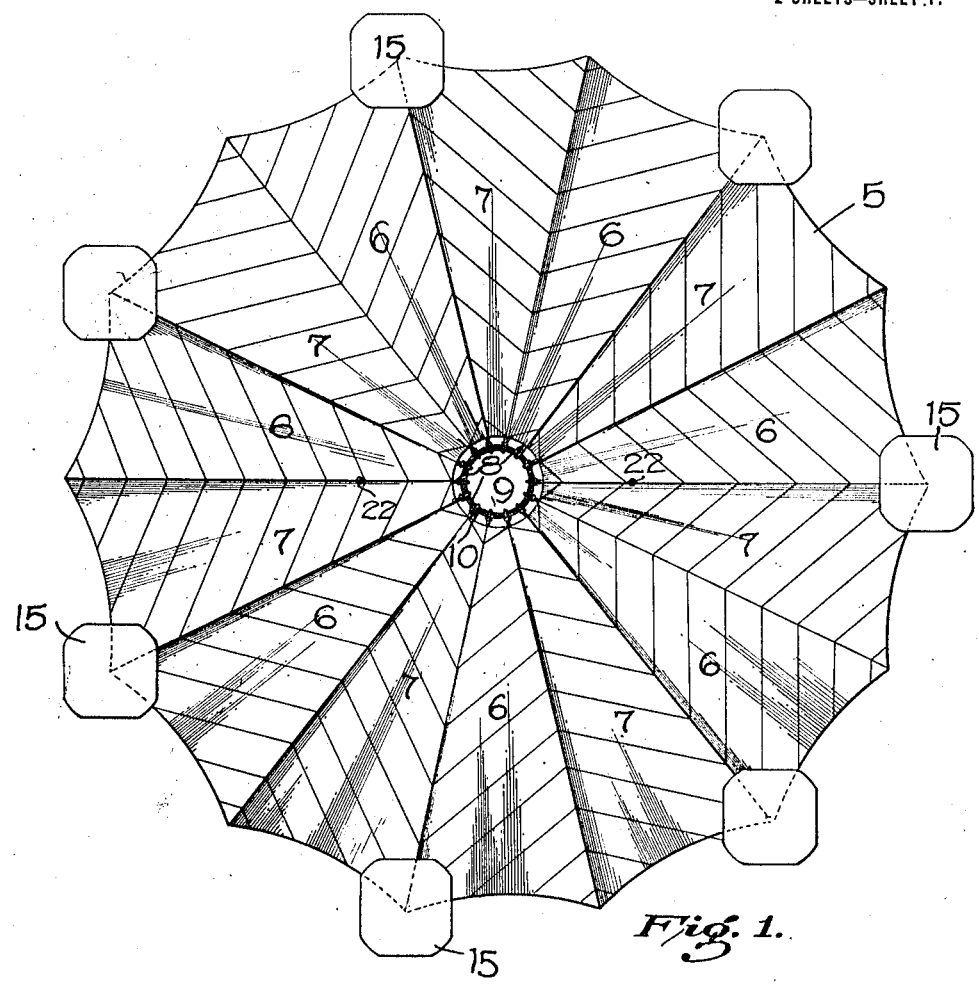
Figure 1 is a plan view of the parachute of my invention in its fully unfurled condition, illustrating the office of the auxiliary surfaces.

As shown, the preferred construction comprises; the main parachute 5; the auxiliary parachute surfaces 15; and the container 17 for normally housing the parachute. The main parachute, denoted by the numeral 5, has its supporting surface made up of a number of triangular panels 6 which are spaced from and connected to each other by interposed panels 7 of the same configuration. Each of these panels is built up of a number of strips of a suitable fabric which are preferably cut to run on the bias across the panel. The fabric bias of the panels 7 is opposed to the bias of the panels 6, (as is illustrated in Fig. 1), to lend strength to the construction. At the meeting edges, each pair of panels 6 and 7 are cemented and sewed or otherwise suitably secured along lines which are radial from a common center.

Flexible suspension elements 8 radiate from an aperture 9 formed centrally of the parachute, and are attached to a flexible anchoring ring 10 maintained in the aperture. These suspension elements are secured to the panels 6 and 7 of the parachute along the seams joining pairs of adjacent panels and converge from the parachute edges downwardly to the flexible anchoring ring 11, for an even distribution of weight suspended from this lower anchor ring over the entire paneled surface of the parachute. The center aperture is provided, as is customary, in order to help the parachute to maintain a steady vertical course, as there is thus provided a symmetrical central escapement for the air through which the parachute passes in its downward flight. From the ring 11 depend the handles 12 which the aeronaut grasps in using the parachute, and a strap 13 which carries a snap hook 14 to engage with a suitable hasp which may be provided upon the aviator's belt, as a precautionary measure.

As provided by this invention, a number of small parachute surfaces 15 are secured at the extremities of certain of the flexible ribs 8 by suspension lines 16. These parachute surfaces are here shown as square but they may obviously partake of any configuration found to be desirable. Preferably, the auxiliary surfaces 15 remain unfolded when stowed away, and for this reason they are best constructed of a single piece of material, in order that they may open immediately to the action of the relatively upward wind rush, thus performing their parachute-opening function with greatest speed and efficiency. As here shown, I have provided a number of the auxiliary parachute surfaces 15 such that one is attached to each alternate rib 8. There is nothing to limit me to this particular choice, however, as the parachute may be equipped with more or with less of these auxiliary surfaces.

The container 17 for my parachute is of a novel construction in that it permits an instantaneous loosening of the parachute therefrom when the weight of the aeronaut is suddenly suspended from the handles 12 or from the strap 13. The body portion of this container may be of cardboard or other suitable material in the form of an open cylinder 18. Over this cardboard is stretched a suitable weather-proof cover such as the coated fabric 19. This fabric covering tightly closes the upper end of the cylinder 18, but at the lower end is loosely drawn together with a breakable cord 20. The parachute is furled and packed within a very small compass within the cylindrical retainer and is supported therein by a breakable cord 21 which is passed beneath the center ring 10 and through small loops 22 arranged at the top of the parachute, and which is terminally secured by looped straps 23 fastened to the container 18. One of these straps 23 may be suitably employed to support the container upon the side of the balloon basket or aeroplane fuselage. When it is necessary for the aviator to employ the parachute to insure a safe landing upon the ground, he buckles the snap hook depending from the parachute ring 11 to his belt hasp, if he has sufficient time to do so. Otherwise, he grasps the handles 12 and leaps out from his craft. His weight being suddenly transferred to the breakable cord 20, the balloon is released from its cylindrical container and unfurled until the strain is transferred to the uppermost breakable cord 21 which then severs all connection between the parachute and its case and thus permits the parachute to be cast off in the vertical position corresponding to its flying attitude.

What I claim is:

1. In a parachute, triangular panels forming the main supporting surface of the parachute, each panel being constructed from a fabric cut on a bias and making an angle with the bias of the fabric used to construct the adjacent panels.

2. In a parachute, triangular panels forming the main supporting surface of the parachute, each panel being constructed of fabric strips laid upon the bias across the panel, and adjacent panels having their constituent fabric strips arranged at corresponding angles to each other.

3. In a parachute, a central escapement for air, a set of spaced triangular panels radiating outwardly from the central escapement and each panel formed of fabric strips laid parallel to each other but obliquely to the panel axis and an alternate set of triangular panels formed of fabric strips cut upon a bias equal but symmetrically opposite to the bias of the fabric strips of the first mentioned panels, the panels of the second mentioned set spacing and connecting adjacent panels of the first mentioned set.

4. A main parachute provided with a plurality of spaced auxiliary parachute surfaces which are disposed on the upper side of and have connections to, the peripheral portion of the main parachute surface, said auxiliary parachute surfaces being adapted to open automatically and act to open said main parachute surface.

5. A parachute having a main supporting surface, a plurality of spaced auxiliary surfaces disposed on the upper side of said main supporting surface, and lines connecting said auxiliary surfaces to the peripheral portion of said main supporting surface, said auxiliary surfaces being adapted to open automatically and act to open said main supporting surface, substantially as set forth.

In testimony whereof I have signed my name in the presence of two subscribing witnesses.

RALPH H. UPSON.

Witnesses:
B. J. McDanel,
L. E. Wagner.